United States Patent Office 3,574,206 Patented Apr. 6, 1971

1

3,574,206

2,7-DIMORPHOLINO-4-AMINO-6-PHENYL-PTERIDINES

Josef Roch, Biberach (Riss), Germany, assignor to Boehringer Ingelheim G.m.b.H., Ingelheim am Rhein, Germany No Drawing. Continuation-in-part of application Ser. No. 541,973, Apr. 12, 1966. This application Apr. 1, 1968, Ser. No. 717,906
Claims priority, application Germany, Apr. 15, 1965, P 16 20 498.1
Int. Cl. C07d *87/40*
U.S. Cl. 260—246 6 Claims

ABSTRACT OF THE DISCLOSURE

Compounds of the formula

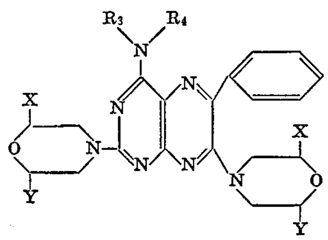

wherein

X and Y are each hydrogen or methyl,
$R_3$ is alkyl of 1 to 4 carbon atoms, benzyl, cyclohexyl or monohydroxyalkyl of 2 to 3 carbon atoms, and
$R_4$ is alkyl of 2 to 6 carbon atoms in which at least one of the carbon atoms except that adjacent to the nitrogen atom is monohydroxy-substituted;

the compounds are useful as coronary dilators in warm-blooded animals.

This is a continuation-in-part of copending application Ser. No. 541,973, filed Apr. 12, 1966, now abandoned.

This invention relates to novel pteridine derivatives, to various methods of preparing these compounds, as well as to pharmacodynamic compositions containing said pteridine derivatives as active ingredients and to a method of treating warm-blooded animals with said compounds.

More particularly, the present invention relates to a novel class of pteridine substitution products of the formula

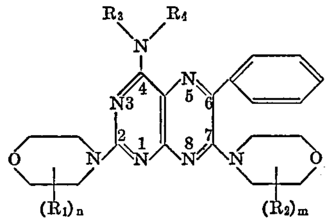

wherein $R_1$ and $R_2$, which may be identical to or different from each other, are lower alkyl, especially methyl,

2

*m* and *n*, which may be identical to or different from each other, are integers from 0 to 4, inclusive, preferably 0 to 2,
$R_3$ is lower alkyl, benzyl, cyclohexyl or hydroxy-substituted lower alkyl, and
$R_4$ is hydroxy-substituted lower alkyl.

The compounds according to the present invention may be prepared by a number of different methods which involve well known chemical principles; however, among these the following are especially convenient and efficient:

METHOD A

By reacting a pteridine substitution product of the formula

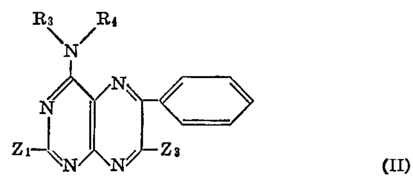

wherein $R_3$ and $R_4$ have the same meanings as in Formula I, and $Z_1$ and $Z_3$ are halogen atoms, substituted hydroxyl groups or substituted mercapto groups, with a morpholine compound of the formula (IIIa)

or (IIIb)

wherein $R_1$, $R_2$, *m* and *n* have the same meanings as in Formula I.

METHOD B

By reacting a pteridine substitution product of the formula

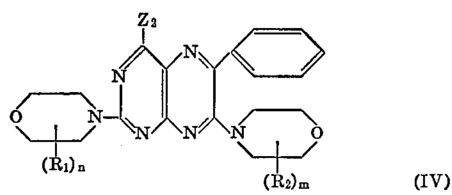

wherein $R_1$, $R_2$, *n* and *m* have the same meanings as in Formula I, and $Z_2$ is a halogen atom, a substituted hydroxyl group or a substituted mercapto group, with a secondary amine of the formula $$HN\begin{matrix} R_3 \\ R_4 \end{matrix} \quad (V)$$

wherein $R_3$ and $R_4$ have the same meanings as in Formula I.

The reactions of methods A and B above are most advantageously performed at a temperature between room temperature and 200° C., and in the presence of an inert organic solvent and an acid-binding agent, if necessary. By "acid-binding agent" I mean a compound capable of tying up or neutralizing the hydrogen halide released by the reaction when $Z_1$, $Z_2$ or $Z_3$ in compounds II and IV above are halogen atoms.

The selection of the most effective reaction temperature depends largely upon the nature of substituents $Z_1$, $Z_2$ and $Z_3$ in pteridine compounds II and IV as well as upon the reactivity of the morpholine compound III*a* or III*b* and the secondary amine V. If $Z_1$, $Z_2$ and/or $Z_3$ are halogen atoms, only moderately elevated temperatures are required; on the other hand, if $Z_1$, $Z_2$ and/or $Z_3$ are substituted hydroxyl groups or substituted mercapto groups, the reaction will proceed satisfactorily only at substantially higher temperatures. In those instances where the reaction is sluggish, it may also be advantageous to add an accelerator to the reaction mixture, preferably a copper salt or a salt formed by compound III*a*, III*b* or V with an acid; the reaction may also be accelerated by carrying it out in a closed vessel.

Examples of preferred substituents for the substituted hydroxyl or mercapto groups represented by $Z_1$, $Z_2$ and $Z_3$ are lower alkyl, aralkyl or aryl.

Examples of suitable inert organic solvents are acetone, benzene, dioxane and dimethylformamide.

Examples of suitable acid-binding agents are inorganic or tetiary organic bases, such as alkali metal hydroxides, alkali metal carbonates and trialkylamines. However, a stoichiometric excess of the morpholine III*a* or III*b* or the secondary amine V over and above the amount required for reaction with the pteridine derivatives II or IV may also serve as the acid-binding agent and/or the solvent medium.

If the morpholino substituents in the 2- and 7-positions of Formula I are to be identical, at least two mols of a morpholine compound III*a* or III*b* must be provided per mol of the pteridine compound II in method A. On the other hand, if the morpholino substituents are to be different, they may be introduced in stepwise fashion; thus, if $Z_1$ and $Z_3$ in pteridine compound II are identical, for instance, identical halogen atoms, the pteridine compound II is first reacted with one mol equivalent of morpholine compound III*a*, and the reaction product is then reacted with at least one mol equivalent or morpholine compound III*b*. If $Z_1$ and $Z_3$ in pteridine compound II are different, for instance, if one is a halogen atom and the other is a substituted hydroxyl or mercapto group, the halogen atom will, as a rule, be replaced first.

The pteridine starting compounds II and IV may be prepared by the method described in German Patent No. 1,088,969. For instance, a compound of the Formula II may be prepared by reacting a corresponding 6-phenyl-2,4,7-trichloro-pteridine with a secondary amine V; similarly, a compound of the Formula IV may be prepared by reacting a 2,7-dichloro-4-alkylmercapto-6-phenyl-pteridine with a morpholine compound III*a* or III*b*.

Accordingly, using the process described in said German patent, the following starting compounds of the Formula II or IV were prepared:

2,7-dichloro-4-methylethanolamino-6-phenyl-pteridine, M.P. 170–172° C.;
2,7-dichloro-4-propylethanolamino-6-phenyl-pteridine, M.P. 163–165° C.;
2,7-dichloro-4-isopropylethanolamino-6-phenyl-pteridine, M.P. 163–164° C.;
4-butylethanolamino-2,7-dichloro-6-phenyl-pteridine, M.P. 107–109° C.;
4-benzylethanolamino-2,7-dichloro-6-phenyl pteridine, M.P. 120–125° C.;
4-ethanolpropanolamino-2,7-dichloro-6-phenyl-pteridine, M.P. 166–168° C.;
4-(ethanol-1′-methylisopropanolamino)-2,7-dichloro-6-phenyl-pteridine, M.P. 165–167° C. (decomposition);
2,7-dichloro-4-(2′,3′-dihydroxypropyl-methylamino)-6-phenyl-pteridine, M.P. 165–167° C.;
2,7-dichloro-4-(2′,3′-dihydroxypropyl-ethylamino)-6-phenyl-pteridine, M.P. 184–185° C.;
2,7-dichloro-4-diethanolamino-6-phenyl-pteridine, M.P. 180–181° C.;
2,7-dichloro-4-(2′,3′-dihydroxyproylbenzylamino)-6-phenyl-pteridine, M.P. 122–130° C.;
2,7-dichloro-4-(2′,3′-dihydroxypropyl-cyclohexyl-amino)-6-phenyl-pteridine, M.P. 171–172° C.;
7-chloro-4-(2′,3′-dihydroxypropyl-ethylamino)-2-morpholino-6-phenyl-pteridine, M.P. 130–135° C.;
7-chloro-4-diethanolamino-2-(2′,6′-dimethyl-morpholino)-6-phenyl-pteridine, M.P. 100–115° C.;
7-chloro-4-diisopropanolamino-2-methylthio-6-phenyl-pteridine, M.P. 199–201° C. (decomposition);
4-diisopropanolamino-2-methylthio-7-morpholino-6-phenyl-pteridine, M.P. 234–235° C. (decomposition);
7-chloro-4-diethanolamine-2-methylthio-6-phenyl-pteridine, M.P. 183–185° C.;
4-diethanolamino-7-(2′,6′-dimethylmorpholino)-2-methylthio-6-phenyl-pteridine, M.P. 110–111° C. (decomposition);
7-ethoxy-4-diisopropanolamino-2-morpholino-6-phenyl-pteridine, M.P. 203–205° C.;
7-benzyloxy-4-diisopropanolamino-2-morpholino-6-phenyl-pteridine, M.P. 226–227° C.;
4-diisopropanolamino-2-morpholino-7-phenoxy-6-phenyl-pteridine, M.P. 148–150° C.;
7-ethylthio-4-diisopropanolamino-2-morpholino-6-phenyl-pteridine, M.P. 202–203° C.

The following examples further illustrate the present invention and will enable others skilled in the art to understand it more completely. It should be understood, however, that the present invention is not limited to the particular examples given below.

Example 1

Preparation of 2,7-dimorpholino-4-diisopropanolamino-6-phenyl-pteridine by Method A.—8.2 gm. (0.02 mol) of 2,7 - dichloro-4-diisopropanolamino-6-phenyl-pteridine (M.P. 186–187° C.) were admixed with 25 cc. of morpholine, and the mixture was refluxed for thirty minutes. Thereafter, while the dark-colored reaction solution was still hot, it was poured into about 500 cc. of water, whereby an orange precipitate formed. The aqueous mixture was allowed to stand for some time, then vacuum-filtered, and the filter cake was washed with water and dried. 9.8 gm. (96% of theory) of raw reaction product were obtained. For purification, the raw product was dissolved in 0.1 N hydrochloric acid, reprecipitated with 2 N ammonia, and recrystallized from methanol. The purified product had a melting point of 193–195° C.; it was identified to be 2,7-dimorpholino-4-diisopropanolamino-6-phenyl-pteridine of the formula

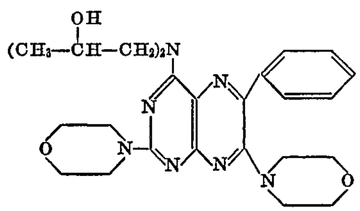

Example 2

Using a procedure analogous to that described in Example 1, 2,7-dimorpholino - 4 - diisopropanolamino-6-phenyl-pteridine was prepared from 9.2 gm. (0.01 mol) of 2-morpholino-4-diisopropanolamino-6-phenyl-7-chloro-pteridine (M.P. 191–195° C.) and 25 cc. of morpholine.

Example 3

Preparation of 2,7 - dimorpholino-4-ethylenethanolamino-6-phenyl-pteridine by Method A.—7.3 gm. (0.02 mol) of 2,7-dichloro-4-ethylethanolamino - 6 - phenyl-pteridine (M.P. 158–159° C.) were admixed with 20 cc. of morpholine, and the mixture was refluxed for twenty minutes. Thereafter, the reaction solution was worked up as described in Example 1. 9.1 gm. (98% theory) of raw reaction product were obtained. The raw product was recrystallized once from methanol and reprecipitated once from 0.1 N hydrochloric acid with 2 N ammonia. Thus purified, the product had a melting point of 187–189° C.; it was identified to be 2,7-dimorpholino-4-ethylethanolamino-6-phenyl-pteridine of the formula

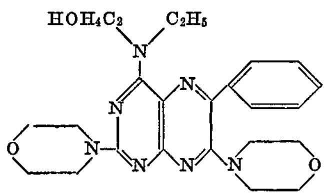

Example 4

Using a procedure analogous to that described in Example 3, 2,7-dimorpholino - 4 - ethylethanolamino-6-phenyl-pteridine was prepared from 8.3 gm. (0.02 mol) of 2-morpholine - 4 - ethylethanolamino-6-phenyl - 7-chloro-pteridine (M.P. 199–200° C.) and 20 cc. of morpholine.

Example 5

Using a procedure analogous to that described in Example 3, 2,7 - dimorpholino-4-ethanolisopropanolamino-6-phenyl-pteridine, M.P. 237–239° C., of the formula

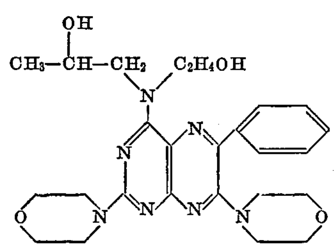

was prepared from 2,7-dichloro-4-ethanolisopropanolamino-6-phenyl-pteridine (M.P. 196–198° C.) and morpholine. The yield was 95% of theory.

Example 6

Using a procedure analogous to that described in Example 3, 2,7-dimorpholino-4-ethanolisopropanolamino-6-phenyl-pteridine was prepared from 2-morpholino-4-ethanol-isopropanolamino-6-phenyl - 7 - chloro-pteridine (M.P. 194–195° C.) and morpholine.

Example 7

Preparation of 2,7-dimorpholino-4-ethylethanolamino-6-phenyl-pteridine by Method A.—3.8 gm. (0.01 mol) of 2-methylthio-4-ethylethanolamino - 6 - phenyl - 7-chloro-pteridine (M.P. 145–147° C.) were admixed with 20 cc. of morpholine, a small amount of copper sulfate was added, and the mixture was heated for two hours at about 200° C. in a sealed pressure tube. Thereafter, the dark-colored reaction solution was poured into about 400 cc. of water, whereby a deep orange precipitate formed. The precipitate was separated and immediately reprecipitated once from 0.1 N hydrochloric acid with 2 N ammonia. 3.1 gm. (66% of theory) of raw reaction product were obtained. The raw product was recrystallized from methanol and then again reprecipitated from 0.1 N hydrochloric acid. Thus purified, the product had a melting point of 187–189° C.; it was identified to be 2,7-dimorpholino - 4 - ethylethanolamino - 6 - phenyl-pteridine.

Example 8

Preparation of 2,7-dimorpholino-4-ethylethanolamino-6-phenyl-pteridine by Method B.—2.1 gm. (0.005 mol) of 2,7 - dimorpholino - 4 - ethylthio-6-phenyl-pteridine (M.P. 244–245° C.) were admixed with 20 cc. of ethylethanolamine, a small amount of ethylethanolamine hydrochloride was added, and the mixture was refluxed for about 15 hours. Thereafter, the excess unreacted ethylethanolamine was distilled off in vacuo, and the residue was poured into about 200 cc. of water, whereby a precipitate formed. The precipitate was separated, recrystallized from a 2:1 mixture of ethylenechloride and cyclohexane, and reprecipitated from 0.1 N hydrochloric acid with 2 N ammonia. 0.9 gm. (38% of theory) of a compound was obtained, which was found to be identical with the end product of Example 7.

The same results were obtained when 0.005 mol of 2,7-dimorpholino-4-ethoxy - 6 - phenyl-pteridine was used as the starting material in place of 2,7-dimorpholino-4-ethylthio-6-phenyl-pteridine.

Example 9

Using a procedure analogous to that described in Example 8, 2,7-dimorpholino - 4 - ethylethanolamino-6-phenyl-pteridine was prepared from 2,7-dimorpholino-4-phenylthio-6-phenyl-pteridine (M.P. 229–231° C.) and ethylethanolamine. The yield was about 45% of theory.

Example 10

Using a procedure analogous to that described in Example 8, 2,7-dimorpholino - 4 - ethylethanolamine -6-phenyl-pteridine was prepared from 2,7-dimorpholino-4-benzylthio-6-phenyl-pteridine and ethylethanolamine. The yield was about 45% of theory.

Example 11

Preparation of 2,7-dimorpholino-4-ethanolisopropanolamino-6-phenyl-pteridine by Method A.—5.1 gm. (0.01 mol) of 2,7 - diphenoxy - 4 - ethanolisopropanolamino-6-phenyl-pteridine were admixed with 50 cc. of morpholine, 1 gm. of morpholine hydrochloride was added, and the mixture was refluxed for twelve hours. Thereafter, the reaction solution was evaporated to about half its volume and was then poured into about 300 cc. of water. After a short period of time an amorphous yellow precipitate formed, which was separated by vacuum filtration. The filter cake was washed with water and dried, yielding 4.1 gm. (83% of theory) of raw reaction product. The raw product was reprecipitated once from 0.1 N hydrochloric acid with 2 N ammonia, and then recrystallized once from a 5:1 mixture of ethanol and dioxane. Thus purified, the product had a melting point of 235–237° C.; it was identified to be 2,7-dimorpholino-4-ethanolisopropanolamino-6-phenyl-pteridine.

Example 12

Using a procedure analogous to that described in Example 11, 2,7 - dimorpholino - 4 - ethanolisopropanolamino-6-phenyl-pteridine was prepared from 5 gm. (0.01 mol) of 2 - morpholino - 4 - ethanolisopropanolamino-6-phenyl-7-phenoxy-pteridine (M.P. 187–189° C.) and 50 cc. of morpholine. The yield was 4.5 gm. (91% of theory).

Example 13

Preparation of 2,7-dimorpholino-4-diisopropanolamino-6-phenyl-pteridine by Method A.—4.8 gm. (0.01 mol) of 2 - methylthio - 4-diisopropanolamino - 6 - phenyl-7-phenoxy-pteridine (M.P. 192–193° C.) were admixed with 30 cc. of morpholine, a small amount of morpholine hydrochloride was added, and the mixture was refluxed for about twelve hours. The reaction solution was thereafter poured into about 400 cc. of water, whereby a yellow amorphous precipitate formed. The precipitate was separated, washed with water and dried, yielding 3.3 gm. (65% of theory) of raw reaction product. The raw product was reprecipitated once from 0.1 N hydrochloric acid with 2 N ammonia and then recrystallized twice from ethanol. Thus purified, it had a melting point of 193–195° C.; it was identified to be 2,7-dimorpholino-4-diisopropanolamino-6-phenyl-pteridine.

Example 14

Using a procedure analogous to that described in Example 13, 2,7 - dimorpholino - 4-diisopropanolamino-6-phenyl-pteridine was prepared from 5.2 gm. (0.01 mol) of 2,7-diphenoxy-4-diisopropanolamino-6-phenyl-pteridine (M.P. 70–100° C.) and 30 cc. of morpholine. The yield was 3.8 gm. (75% of theory).

Example 15

A mixture of 0.01 mol of 2-morpholino-4-diisopropanolamino - 6-phenyl-7-phenylthio-pteridine (M.P. 202–203° C.), 20 cc. of morpholine and small amounts of morpholine acetate and copper sulfate was heated for three hours at 200° C. in a sealed pressure tube. Thereafter, the reaction solution was worked up as described in Example 7, yielding 55% of theory of 2,7-dimorpholino-4-diisopropanolamino-6-phenyl-pteridine.

Example 16

Using a procedure analogous to that described in Example 15, 2,7 - dimorpholino - 4-diisopropanolamino-6-phenyl-pteridine was prepared from 2-morpholino-4-diisopropanolamino - 6 - phenyl - 7-benzylthio-pteridine (M.P. 198–199° C.) and morpholine.

Example 17

Using a procedure analogous to that described in Example 15, 2,7 - dimorpholino - 4-diisopropanolamino-6-phenyl-pteridine was prepared from 2,7-diphenylthio-4-diisopropanolamino-6-phenyl-pteridine and morpholine.

Example 18

Using a procedure analogous to that described in Example 1, 2,7 - dimorpholino - 4-methylethanolamino-6-phenyl-pteridine, M.P. 246–248° C., of the formula

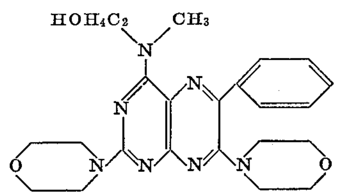

was prepared from 2,7-dichloro-4-methylethanolamino-6-phenyl-pteridine and morpholine.

Example 19

Using a procedure analogous to that described in Example 1, 2,7-dimorpholino-4-n-propylethanolamino-6-phenyl-pteridine, M.P. 184–186° C., of the formula

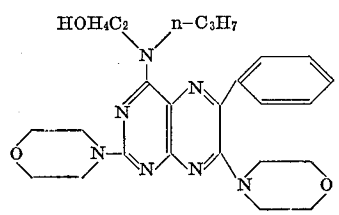

was prepared from 2,7-dichloro-4-n-propylethanolamino-6-phenyl-pteridine and morpholine.

Example 20

Using a procedure analogous to that described in Example 1, 2,7-dimorpholino-4-isopropylethanolamino-6-phenyl-pteridine, M.P. 192–194° C., of the formula

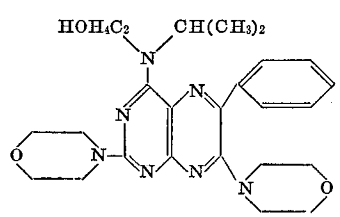

was prepared from 2,7-dichloro-4-isopropylethanolamino-6-phenyl-pteridine and morpholine.

Example 21

Using a procedure analogous to that described in Example 1, 2,7 - dimorpholino - 4 - n - butylethanolamino-6-phenyl-pteridine, M.P. 157–158° C., of the formula

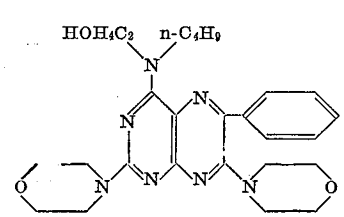

was prepared from 2,7-dichloro-4-n-butylethanolamino-6-phenyl-pteridine and morpholine.

Example 22

Using a procedure analogous to that described in Example 1, 2,7 - dimorpholino - 4 - benzylethanolamino-6-phenyl-pteridine, M.P. 166–168° C., of the formula

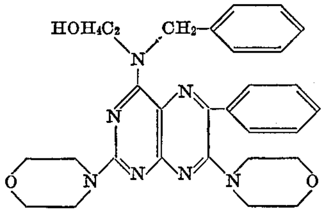

was prepared from 2,7-dichloro-4-benzylethanolamino-6-phenyl-pteridine and morpholine.

Example 23

Using a procedure analogous to that described in Example 1, 2,7 - dimorpholino - 4 - n - propanolethanolamino-6-phenyl-pteridine, M.P. 208–210° C., of the formula

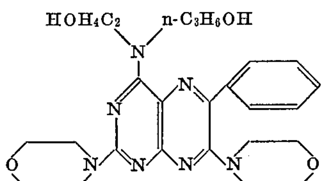

was prepared from 2,7-dichloro-4-n-propanolethanolamino-6-phenyl-pteridine and morpholine.

Example 24

Using a procedure analogous to that described in Example 8, 2,7 - dimorpholino - 4 - n - propanolethanolamino-6-phenyl-pteridine was prepared from 2,7-dimorpholino-4-ethylthio-6-phenyl-pteridine and n - propanolethanolamine.

Example 25

Using a procedure analogous to that described in Example 1, 2,7 - dimorpholino - 4 - (ethanol - 1′ - methylisopropanolamino)-6-phenyl-pteridine, M.P. 210–212° C., of the formula

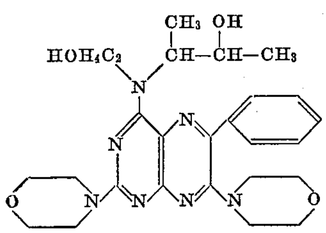

was prepared from 2,7-dichloro-4-(ethanol-1′-methylisopropanolamino)-6-phenyl-pteridine and morpholine.

Example 26

Using a procedure analogous to that described in Example 1, 2,7 - dimorpholino - 4 - (2′,3′ - dihydroxy - n-propylmethylamino)-6-phenyl-pteridine, M.P. 234–235° C., of the formula

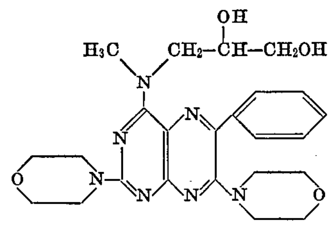

was prepared from 2,7-dichloro-4-(2′,3′-dihydroxy-n-propylmethylamino)-6-phenyl-pteridine and morpholine.

Example 27

Using a procedure analogous to that described in Example 8, 2,7 - dimorpholino - 4 - (2′,3′ - dihydroxy - n-propylmethylamino)-6-phenyl - pteridine was prepared from 2,7 - dimorpholino - 4 - ethylthio - 6 - phenyl - pteridine and 2,3-dihydroxy-n-propyl-methylamine.

Example 28

Using a procedure analogous to that described in Example 1, 2,7 - dimorpholino - 4 - (2′,3′ - dihydroxy - n-propylethylamino)-6-phenyl-pteridine, M.P. 222–224° C., of the formula

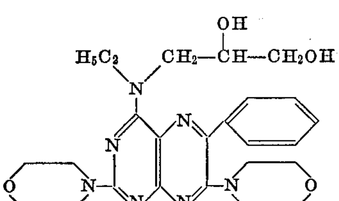

was prepared from 2,7-dichloro-4-(2′,3′-dihydroxy-n-propylethylamino)-6-phenyl-pteridine and morpholine.

Example 29

Using a procedure analogous to that described in Example 8, 2,7 - dimorpholino - 4 - (2′,3′ - dihydroxy - n-propylethylamino-6-phenyl-pteridine was prepared from 2,7 - dimorpholino - 4 - ethylthio - 6 - phenyl - pteridine and 2,3-dihydroxy-n-propyl-ethylamine.

Example 30

Using a procedure analogous to that described in Example 1, 2,7 - dimorpholino - 4 - methylglucamino - 6-phenyl-pteridine, M.P. 105–112° C., of the formula

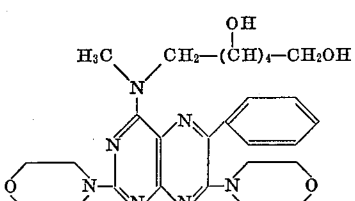

was prepared from 2,7-dichloro-4-methylglucamino-6-phenyl-pteridine and morpholine.

Example 31

Using a procedure analogous to that described in Example 1, 2,7-bis-(2′,6′-dimethylmorpholino)-4-diethanolamino-6-phenyl-pteridine, M.P. 209–211° C., of the formula

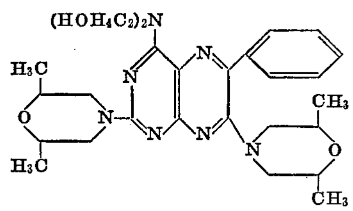

was prepared from 2,7-dichloro-4-diethanolamino-6-phenyl-pteridine and 2,6-dimethylmorpholine.

Example 32

Using a procedure analogous to that described in Example 7, 2,7-bis-(2′,6′-dimethylmorpholino)-4-diethanolamino-6-phenyl-pteridine was prepared from 2-methylthio-4-diethanolamino - 6 - phenyl - 7(2′,6′-dimethylmorpholino)-pteridine and 2,6-dimethymorpholine.

Example 33

Using a procedure analogous to that described in Example 1, 2-morpholino-4-ethylethanolamino-6-phenyl-7-(2′,6′-dimethylmorpholino)pteridine, M.P. 206–208° C., of the formula

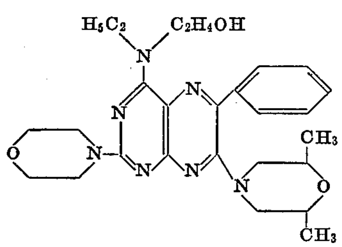

was prepared from 2-morpholino-4-ethylethanolamino-6-phenyl-7-chloro-pteridine and 2,6-dimethylmorpholine.

Example 34

Using a procedure analogous to that described in Example 1, 2,7 - dimorpholino-4-(2′,3′-dihydroxy-n-propylbenzylamino)-6-phenyl-pteridine, M.P. 240–242 C., of the formula

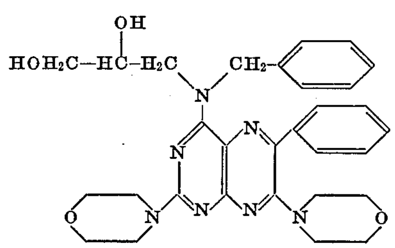

was prepared from 2,7-dichloro-4-(2′,3′-dihydroxy-n-propyl-benzylamino-6-phenyl-pteridine and morpholine.

Example 35

Using a procedure analogous to that described in Example 1, 2,7-dimorpholino-4-(2′,3′-dihydroxy-n-propylcyclohexylamino)-6-phenyl-pteridine, M.P. 170–173° C., of the formula

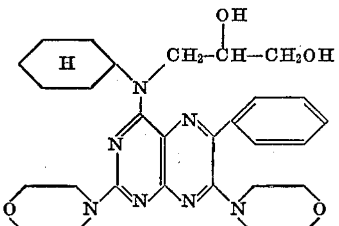

was prepared from 2,7-dichloro-4-(2′,3′-dihydroxy-n-propyl-cyclohexylamino) - 6 - phenyl-pteridine and morpholine.

Example 36

Using a procedure analogous to that described in Example 1, 4 - (N-ethanol-isopropanolamino)-2,7 - di(2′-methylmorpholino)-6-phenyl - pteridine, M.P. 175–177° C., was prepared from 4-(N-ethanol-isopropanolamino)-2,7-dichloro-6-phenyl-pteridine (M.P. 196–198° C. and 2-methylmorpholine.

Example 37

Using a procedure analogous to that described in Example 2, 4-(N-ethanol-isopropanolamino)-2,7-di(2′-methylmorpholino)-6-phenyl-pteridine was prepared from 4-(N-ethanol-isopropanolamino) - 7 - chloro-2-(2′-methylmorpholino)-6-phenyl-pteridine (M.P. 105–110° C.) and 2-methyl-morpholine.

Example 38

Using a procedure analogous to that described in Example 11, 4-(N-ethanol-isopropanolamino) - 2,7-di(2′-methylmorpholino)-6-phenyl-pteridine was prepared from 4 - (N-ethanol-isopropanolamino)-2,7-diphenoxy-6-phenyl-pteridine (M.P. 85–105° C.) and 2-methyl-morpholine.

Example 39

Using a procedure analogous to that described in Example 2, 4-(N-ethanol-isopropanolamino)-2-(2′-methylmorpholino)-7-morpholino-6-phenyl-pteridine, M.P. 192–194° C., was prepared from 4-(N-ethanol-isopropanolamino)-7-chloro-2-(2′-methylmorpholino) - 6 - phenylpteridine (M.P. 105–110° C.) and morpholine.

Example 40

Using a procedure analogous to that described in Example 2, 4-diisopropanolamino-2-(2′-methylmorpholino)-7-morpholino-6-phenyl-pteridine, M.P. 112–130° C., was prepared from 7-chloro-4-diisopropanolamino-2-(2′-methyl-morpholino)-6-phenyl-pteridine (M.P. 115–120° C.) and morpholine.

Example 41

Using a procedure analogous to that described in Example 7, 4-diisopropanolamino-2-(2′-methylmorpholino)-7-morpholino-6-phenyl-pteridine was prepared from 4-diisopropanolamino - 2 - methylthio - 7 - morpholino - 6-phenyl-pteridine (M.P. 234–235° C.) and 2-methyl-morpholine.

Example 42

Using a procedure analogous to the described in Example 2, 4-(2′,3′-dihydroxypropyl-methylamino) - 2 - (2′-methylmorpholino)-7-morpholino - 6 - phenyl-pteridine, M.P. 177–181° C., was prepared from 7-chloro-4-(2′,3′-dihydroxy-propyl-methylamino) - 2 - (2′-methylmorpholino)-6-phenyl-pteridine (M.P. 110–115° C.) and morpholine.

The compounds according to the present invention, that is, those embraced by Formula I above, have useful pharmacodynamic properties. More particularly, they exhibit very effective, long-lasting coronary dilating properties in warm-blooded animals, such as dogs. In addition, the compounds of the instant invention exhibit hypotensive, spasmolytic and positive inotropic activities in warm-blooded animals, such as dogs; moreover, they protect the heart against oxygen insufficiency and suppress thrombocyte agglutination in warm-blooded animals, such as dogs. Their toxicity values are very low, wherefore their therapeutic ratio is extremely favorable.

Especially effective are the following compounds:

4-diisopropanolamino-2,7-dimorpholino-6-phenyl-pteridine,
4-ethanolisopropanolamino-2,7-dimorpholino-6-phenyl-pteridine,
4-(2′,3′-dihydroxypropyl-methylamino)-2,7-di-morpholino-6-phenyl-pteridine,
4-ethanolpropanolamino-2,7-dimorpholino-6-phenyl-pteridine,
4-(2′,3′-dihydroxypropyl-ethylamino)-2,7-di-morpholino-6-phenyl-pteridine,
4-ethylethanolamino-2,7-dimorpholino-6-phenyl-pteridine,
4-(2′,3′-dihydroxypropyl-benzylamino)-2,7-di-morpholino-6-phenyl-pteridine,
4-diethanolamino-2,7-(2′,6′-dimethylmorpholino)-6-phenyl-pteridine,
4-methylethanolamino-2,7-dimorpholino-6-phenyl-pteridine,
4-diisopropanolamino-2-(2′-methylmorpholino)-7-morpholino-6-phenyl-pteridine,
4-(2′,3′-dihydroxypropyl-methylamino)-2-(2′-methyl-morpholino)-7-morpholino-6-phenyl-pteridine,
4-ethanolisopropanolamino-2,7-di(2′-methyl-morpholino)-6-phenyl-pteridine, and
4-ethanolisopropanolamino-2-(2′-methylmorpholino)-7-morpholino-6-phenyl-pteridine.

The above-indicated utilities of the compounds according to the present invention, as well as their patentable distinction over the most closely related compounds disclosed in U.S. Patent No. 2,940,972, were ascertained by the following comparative tests.

The following compounds were tested for coronary dilating activity, duration of effective action and acute toxicity:

(A) 4-ethanolisopropanolamino-2-(2′-methylmorpholino-7-morpholino)-6-phenyl-pteridine;
(B) 4-diisopropanolamino-2-(2′-methylmorpholino)-7-morpholino-6-phenyl-pteridine;
(C) 4-(2′,3′-dihydroxy-n-propyl-methylamino)-2-(2′-methyl-morpholino)-7-morpholino-6-phenyl-pteridine;
(D) 4-diisopropanolamino-2,7-dimorpholino-6-phenyl-pteridine;
(E) 4-(2′-3′-dihydroxy-n-propyl-methylamino)-2,7-di-morpholino-6-phenyl-pteridine; and
(F) 4-ethanolisopropanolamino-2,7-di(2′-methyl-morpholino)-6-phenyl-pteridine, all according to the present invention, as well as (G) 4-ethanolmethylamino-2,6,7-trimorpholino-pteridine and
(H) 6-phenyl-2,4,7-trimorpholino-pteridine, both described in U.S. Patent No. 2,940,972.

The blood circulation tests were performed on dogs. The rate of coronary blood flow was measured by means of an electromagnetic flowmeter in the descending branch of the left coronary artery before and after administration of each compound under investigation. The arterial blood pressure in the arteria carotis was also measured. Each compound was administered by intravenous injection to groups of 3 to 5 dogs.

The acute toxicity was determined by intravenous injection on adult laboratory mice, and the median lethal dose ($LD_{50}$) with 95% confidence limit was calculated according to Litchfield and Wilcoxon.

The following table shows the results obtained:

| Compound: | $LD_{50}$ i.v., mgm./kg | Dose i.v., mgm./kg. | Average increase in coronary blood flow (percent) | Average duration of effective action (min.) |
|---|---|---|---|---|
| A | 113 | 0.05 | 126 | 72 |
| B | 155 | 0.01 | 69 | 27 |
| C | 170 | 0.01 | 64 | 42 |
| D | 172 | 0.05 | 160 | 47 |
| E | 200 | 0.05 | 84.5 | 28 |
| F | 132 | 0.025 | 107 | 57 |
| G | 162 | 0.5 | 15 | 1.5 |
| H | 41 | 0.1 | 40.1 | 10.4 |

The results tabulated above show quite clearly that the compounds according to the present invention are not only very effective and long-lasting coronary dilators but, when considering the effective dosage, the increase in the rate of coronary blood flow, the duration of effective action and the toxicity, also at least ten times more effective than the nearest analogous compounds of the prior art.

For pharmaceutical purposes the compounds of the present invention are administered to warm-blooded animals perorally or parenterally as active ingredients in customary dosage unit compositions, that is, compositions in dosage unit form consisting essentially of an inert pharmaceutical carrier and one dosage unit of the active ingredient, such as tablets, coated pills, solutions, suspensions, capsules, wafers, suppositories and the like. One dosage unit of the compounds of the invention is from 0.0166 to 3.4 mgm./kg., preferably 0.083 to 1.67 mgm./kg. body weight.

The following examples illustrate a few dosage unit compositions comprising a compound of the instant invention as an active ingredient, and represent the best mode contemplated of putting the invention to practical use. The parts are parts by weight unless otherwise specified.

Example 43

Hypodermic solution.—The solution was compounded from the following ingredients:

| | Parts |
|---|---|
| 2,7 - dimorpholino-4-ethylethanolamino-6-phenyl-pteridine | 10.0 |
| Tartaric acid | 4.0 |
| Polyethyleneglycol 600 | 100.0 |
| Distilled water q.s. ad, 2000.0 parts by vol. | |

Compounding procedure: The polyethyleneglycol was admixed with an equal volume of distilled water, the solution was heated to 80° C., and the tartaric acid and the pteridine compound were dissolved therein. The resulting solution was cooled to room temperature, diluted with distilled water to the indicated volume, and filtered until free from suspended particles. The filtered solution was filled into white 2 cc.-ampules, which were then sterilized for twenty minutes at 120° C. and sealed. Each ampule contained 10 mgm. of the pteridine compound, and when the contents thereof were administered by intravenous injection to a warm-blooded animal of about 60 kg. body weight in need of such treatment, very good coronary dilating effects were obtained.

Example 44

Coated pills.—The pill core composition was compounded from the following ingredients:

| | Parts |
|---|---|
| 4 - ethanolisopropanolamino - 2 - (2'-methylmorpholino) - 7 - morpholino-6-phenylpteridine | 10.0 |
| Lactose | 50.0 |
| Potato starch | 16.5 |
| Polyvinylpyrrolidone | 3.0 |
| Magnesium stearate | 0.5 |
| Total | 80.0 |

Compounding procedure: The pteridine compound, the lactose and the potato starch were intimately admixed with each other, and the mixture was moistened with an ethanolic 25% solution of the polyvinylpyrrolidone. The moist mass was forced through a 1.5 mm.-mesh screen, and the resulting granulate was dried at 45° C. The dry granulate was again passed through the screen and was then thoroughly admixed with the magnesium stearate. The finished mixture was pressed into 80 mgm.-pill cores, which were subsequently coated with a thin shell consisting essentially of sugar and talcum. The coated pills were finally polished with beeswax. Each pill contained 10 mgm. of the pteridine compound and, when administered perorally to a warm-blooded animal of about 60 kg. body weight in need of such treatment, produced very good coronary dilating effects.

Example 45

Tablets.—The tablet composition was compounded from the following ingredients:

| | |
|---|---|
| 4 - ethylisopropanolamino - 2 - (2' - methylmorpholino ) - 7 -morpholino-6-phenyl-pteridine | 20.0 |
| Lactose | 70.0 |
| Potato starch | 23.0 |
| Polyvinylpyrrolidone | 6.0 |
| Magnesium stearate | 1.0 |
| Total | 120.0 |

Compounding procedure: The pteridine compound, the lactose and the potato starch were intimately admixed with each other, and the mixture was moistened with an ethanolic 25 solution of the polyvinylpyrrolidone. The moist mass was forced through a 1.5 mm.-mesh screen, and the resulting granulate was dried at 45° C. The dry granulate was again forced through the screen and was then thoroughly admixed with the magnesium stearate. The finished mixture was pressed into 120 mgm.-tablets. Each tablet contained 20 mgm. of the pteridine compound and, when administered perorally to a warm-blooded animal of about 60 kg. body weight in need of such treatment, produced very good coronary dilating effects.

Example 46

Gelatin capsules.—The capsule filler composition was compounded from the following ingredients:

| | Parts |
|---|---|
| 4 - diisopropanolamine - 2-(2'-methylmorpholino)-7-morpholino-6-phenylpteridine | 20.0 |
| Lactose | 90.0 |
| Talcum | 10.0 |
| Total | 120.0 |

Compounding procedure: The pteridine compound was intimately admixed with the lactose and the talcum, and 120 mgm.-portions of the mixture were filled into gelatin capsules of suitable size. Each capsule contained 20 mgm. of the pteridine compound and, when administered perorally to a warm-blooded animal of about 60 kg. body weight in need of such treatment, produced very good coronary dilating effects.

Example 47

Drop solution.—The solution was compounded from the following ingredients:

| | Parts |
|---|---|
| 2,7 - dimorpholino - 4 - diisopropanolamino - 6-phenyl-pteridine | 20.0 |
| Tartaric acid | 5.0 |
| Cane sugar | 300.0 |
| Sorbic acid | 1.0 |
| Flavoring | 40.0 |
| Ethanol (by vol.) | 200.0 |
| Polyethyleneglycol 600 (by vol.) | 200.0 |

Demineralized water q.s.ad, 1000.0 parts by vol.

Compounding procedure: The sorbic acid was dissolved in the ethanol, an equal volume of demineralized water was added, and the pteridine compound and the tartaric acid were dissolved therein which stirring (solution A). The cane sugar was dissolved in the remaining amount of demineralized water (solution A). Solution B, the polyethyleneglycol and the flavoring were combined with solution A, while stirring, and the combined solution was filtered. 1 cc. (10 drops) of the finished solution contained 20 mgm. of the pteridine compound and, when administered perorally to a warm-blooded animal of about 60 kg. body weight in need of such treatment, produced very good coronary dilating effects.

Example 48

Suppositories.—The suppository composition was compounded from the following ingredients:

| | Parts |
|---|---|
| 2,7 - dimorpholino-4-ethylethanolamino-6-phenyl-phenyl-pteridine | 100.0 |
| Cocoa butter | 1600.0 |
| Total | 1700.0 |

Compounding procedure: The pteridine compound, in finely pulverized form, was stirred with the aid of an immersion homogenizer into the cocoa butter which had been melted and cooled to about 40° C. The resulting mixture was cooled to 35° C. and was then poured into cooled suppository molds, each holding 1700 mgm. of the mixture. Each suppository contained 100 mgm. of the pteridine compound and, when administered by the rectal route to a warm-blooded animal of about 60 kg. body weight in need of such treatment, produced very good coronary dilating effects.

Although the above dosage unit composition examples illustrate only a few specific compounds of the invention as active ingredients, it should be understood that any of the other compounds embraced by Formula I may be substituted for the pteridine compound in Examples 43 through 48. Moreover, the amount of active ingredient in these examples may be varied to achieve the dosage unit range set forth above, and the amounts and nature of the inert carrier ingredients may be varied to meet particular requirements.

While the present invention has been illustrated with the aid of certain specific embodiments thereof, it will be readily apparent to others skilled in the art that the invention is not limited to these embodiments, and that various changes and modifications may be made without departing from the spirit of the invention or the scope of the appended claims.

I claim:

1. A compound of the formula

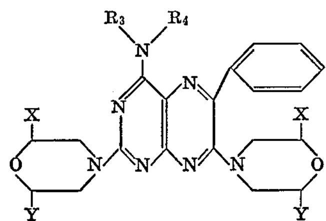

wherein

X and Y are each hydrogen or methyl, $R_3$ is alkyl of 1 to 4 carbon atoms, benzyl, cyclohexyl or monohydroxyalkyl of 2 to 3 carbon atoms, and $R_4$ is alkyl of 2 to 6 carbon atoms in which at least one of the carbon atoms except that adjacent to the nitrogen atom is monohydroxy-substituted.

2. A compound according to claim 1, which is 2,7-dimorpholino-4-diisopropanolamino-6-phenyl-pteridine.

3. A compound according to claim 1, which is 2,7-dimorpholino - 4 - ethanolisopropanolamino - 6 - phenylpteridine.

4. A compound according to claim 1, which is 2,7-dimorpholino-4-ethylethanolamino-6-phenyl-pteridine.

5. A compound according to claim 1, which is 2-(2'-methylmorpholino) - 4 - diisopropanolamino-6-phenyl-7-morpholino-pteridine.

6. A compound according to claim 1, which is 2,7-di(2'-methylmorpholino) - 4 - ethanolisopropanolamino - 6-phenyl-pteridine.

References Cited

UNITED STATES PATENTS 2,940,972 6/1960 Roch -------------- 260—247.5

ALEX MAZEL, Primary Examiner

J. TOVAR, Assistant Examiner

U.S. Cl. X.R.

424—248